United States Patent Office 3,523,877
Patented Aug. 11, 1970

3,523,877
METHOD FOR TREATING A SCRUBBING SOLUTION FOR CHLORINATED HYDROCARBONS
George W. Woest, Baton Rouge, La., assignor to Ethyl Corporation, New York, N.Y., a corporation of Virginia
No Drawing. Filed Mar. 23, 1966, Ser. No. 536,599
Int. Cl. C01d 1/40; C22d 1/00
U.S. Cl. 204—153                        1 Claim

ABSTRACT OF THE DISCLOSURE

Method for scrubbing chlorinated hydrocarbons with caustic solution which has been pretreated to remove metal impurities therefrom by passing an electrical current between spaced apart electrodes in contact with the solution so as to electrodesposit metal impurities such as colloidal copper and nickel from the solution upon at least one of the electrodes.

---

The present invention relates to a process for removing copper, nickel, and other metals from caustic solutions by electrodeposition.

The presence of copper, nickel and other metals in caustic solutions cause severe problems not only in operations involving use of such caustic solutions but in the products eventually derived from such operations, such as petroleum products, paper, and soap. Caustic solutions are frequently used in scrubbing chlorinated hydrocarbons such as ethylene dichloride and vinyl chloride, and here, too, metal impurities create problems. Insofar as copper impurities specifically are concerned, a primary problem is coloration in products due to the presence of the copper ion. Generally, copper is an oxidation catalyst and can cause the creation of undesirable tars, gums and carbon in many liquid hydrocarbon products. Nickel, which is generally a reduction catalyst, can also create undesirable impurities in hydrocarbon products. It is evident that many other problems arise from other metal impurities in hydrocarbon products, depending upon the desired use to which such products are to be put.

The art has sought to remove such impurities both by mechanical and chemical methods. In mechanical methods a number of absorbents have been employed, including activated charcoal, alumina, silica gel, and simple filtration. The best of these is activated charcoal, but it only removes minor amounts of copper. Alumina is even less effective, and both silica gel and filtration are totally ineffective. Among the chemical methods of copper removal, it is known to use potassium thiocyanate, zinc metal, and iron filings. The apparent effectiveness of potassium thiocyanate is high. However, it is known that the blue color of the caustic solution disappears only because the potassium thiocyanate reacts with copper to form a colorless complex and does not remove the copper. The effects of zinc metal are considered to be good; however, while zinc apparently removes the copper, excessive amounts of zinc still remain in the caustic solution thus creating another undesirable impurity. The results of using iron filings are only considered to be fair inasmuch as the reaction utilizing iron filings proceeds so slowly as to be of no practical value.

It is an object of the present invention to overcome each of the above noted disadvantages of the prior art.

It is further an object of the present invention to economically and efficiently remove copper, nickel and other metal impurities from caustic solutions.

Other objects and features of the invention will appear hereinafter.

According to the present invention, electrodeposition is used to remove colloidal copper from highly alkaline caustic solutions. The process is practiced by passing the caustic solution between electrodes in a continuous process or by supporting electrodes in contact with a caustic solution in a batch operation. While it is preferred to use platinum electrodes, other conductive metals such as iron may also be used. The passing of an electric current between the electrodes and through the caustic solution causes the precipitation or electrodeposition of the copper, nickel and various other metal impurities upon the negatively charged electrode. The rate of deposition is dependent upon a number of factors, a principal factor being the amount of current employed. Within limits, the greater the current, the greater the rate of deposition. Current can theoretically be increased until it begins to "flash" between the electrodes without being borne by the ions in the solution. However, as a practical matter, the efficiency of electrodeposition peaks at a value much less than maximum current employable. This is due to the fact that secondary reactions begin to occur at the electrodes which affect deposition, such as, for example, the evolution of gases at the electrodes. The amount of voltage necessary to drive a specific current through a conductive solution likewise depends upon a number of factors, principal ones being the electrical resistance of the solution (which varies with the amount of caustic and impurities in the solution), the distance between the electrodes, and the size, shape and material of the electrodes. The most efficient current (quantity of metal deposited per coulomb of electricity) and corresponding voltage may be determined by recourse to simple experimentation. Electrodes may be periodically cleaned by dipping them in acid solutions.

The present invention shows a dramatic improval over the prior art since virtually 100 percent of the copper, nickel and various other metals can be removed from caustic solutions depending upon the amount of current employed and the time the caustic solution is exposed to electrodeposition. The present method is especially advantageous over chemical methods of removal in that it deposits no third components in the caustic solutions which might prove to be disadvantageous impurities in themselves. As already indicated, no mechanical methods are even remotely sufficient to remove copper, nickel and other metals from caustic solutions.

Having thus set forth the invention, and in order that those skilled in the art may better understand the method of the present invention and in what manner the same may be carried into effect, the following specific examples are offered.

EXAMPLE I

In a first test a six-volt dry cell battery was connected between two pieces of ¼" iron rods approximately ¾" apart and suspended to a depth of about 2" in a 50 percent by weight caustic solution. The caustic solution contained 1.6 p.p.m. copper. The solution was distinctly blue because of the contained copper (probably present as colloidal suspension rather than dissolved). After 30 seconds of applying current to the electrodes, the caustic solution was observed to be completely colorless, indicating that the copper had been removed.

EXAMPLE II

The procedure of Example I was repeated with the same caustic solution using a 1½ volt cell and weighed platinum electrodes. After 1 hour the rods were reweighed and the solution analyzed for copper. The rods showed a gain in weight equivalent to 2.3 p.p.m. and the solution analyzed to 0.4 p.p.m. copper.

It is further evident that the present invention is not only applicable to caustic solutions but it also applies to other aqueous basic solutions containing, for example, potassium hydroxide, calcium hydroxide, or magnesium hydroxide. Other non-aqueous (e.g. alcohols) conductive basic solutions which are well known in the art are within the scope of the present invention.

It will be understood that while there have been given herein certain specific examples of the practice of this invention, it is not intended thereby to have this invention limited to or circumscribed by the specific details of materials, proportions, or conditions herein specified, due to the fact that this invention may be modified according to individual preference or conditions without necessarily departing from the spirit of the disclosure and the scope of the appended claim.

I claim:

1. In the method of scrubbing a chlorinated hydrocarbon with caustic solution, the improvement comprising pretreating said caustic solution to remove therefrom metal impurities selected from the group consisting of copper and nickel by passing an electrical current between spaced apart electrodes in contact with said solution so as to electro deposit said metal impurities from said solution upon at least one of said electrodes.

References Cited

UNITED STATES PATENTS

| | | | |
|---|---|---|---|
| 415,576 | 11/1889 | Siemens | 204—112 |
| 1,275,161 | 8/1918 | Estelle | 204—112 |
| 1,918,477 | 7/1933 | Lang et al. | 204—105 |
| 3,298,802 | 1/1967 | Odekerken | 204—41 X |

J. H. MACK, Primary Examiner

R. L. ANDREWS, Assistant Examiner

U.S. Cl. X.R.

204—105